United States Patent
Grygier et al.

(10) Patent No.: US 7,450,468 B2
(45) Date of Patent: Nov. 11, 2008

(54) METHODS, SYSTEMS, AND COMPUTER READABLE MEDIA FOR INTERACTIVELY DETERMINING PARAMETERS FOR OCEAN-BOTTOM HYDROPHONE/GEOPHONE RECEIVER COMBINATION DEGHOSTING

(75) Inventors: Daniel J. Grygier, Littleton, CO (US); David Earle Johnston, Centennial, CO (US); Stewart A. Levin, Centennial, CO (US)

(73) Assignee: Landmark Graphics Corporation, Houston, TX (US)

(*) Notice: Subject to any disclaimer, the term of this patent is extended or adjusted under 35 U.S.C. 154(b) by 0 days.

(21) Appl. No.: 11/253,432

(22) Filed: Oct. 19, 2005

(65) Prior Publication Data

US 2006/0083107 A1   Apr. 20, 2006

Related U.S. Application Data

(60) Provisional application No. 60/620,137, filed on Oct. 19, 2004.

(51) Int. Cl.
  *G01V 1/38* (2006.01)
(52) U.S. Cl. .............................. 367/24; 367/15; 367/20
(58) Field of Classification Search .................. 367/15, 367/24, 20; 702/17
  See application file for complete search history.

(56) References Cited

U.S. PATENT DOCUMENTS

| | | | | |
|---|---|---|---|---|
| 4,979,150 A | * | 12/1990 | Barr | 367/24 |
| 5,696,734 A | * | 12/1997 | Corrigan | 367/24 |
| 5,774,417 A | * | 6/1998 | Corrigan et al. | 367/24 |
| 5,991,238 A | * | 11/1999 | Barr | 367/62 |
| 6,539,308 B2 | * | 3/2003 | Monk et al. | 702/17 |

* cited by examiner

*Primary Examiner*—Jack W Keith
*Assistant Examiner*—Scott A Hughes
(74) *Attorney, Agent, or Firm*—Merchant & Gould

(57) ABSTRACT

Methods, systems, and computer readable media are provided for interactively determining optimum deghosting parameter values for suppressing ghost reflections. Seismic data are obtained from various hydrophone/geophone receiver locations. Energy traces are generated which include measures of the deghosting parameter values from the seismic data obtained from each of the hydrophone/geophone receiver locations. The energy traces are displayed. A set of seed values is provided by the user. In response to receiving the user seed values, deghosting parameter values are picked based on the energy traces. The picked deghosting parameter values are displayed. A user then interactively edits and/or smooths the picks to obtain optimum deghosting parameter values. The optimum deghosting parameter values are utilized for suppressing ghost reflections in the seismic data.

15 Claims, 5 Drawing Sheets

METHODS, SYSTEMS, AND COMPUTER READABLE MEDIA FOR INTERACTIVELY DETERMINING PARAMETERS FOR OCEAN-BOTTOM HYDROPHONE/GEOPHONE RECEIVER COMBINATION DEGHOSTING

CROSS-REFERENCE TO RELATED APPLICATIONS

This patent application claims the benefit of U.S. Provisional Patent Application No. 60/620,137 entitled "An Interactive System for Ocean-Bottom Hydrophone/Geophone Receiver Combination Deghosting," filed on Oct. 19, 2004 and expressly incorporated herein by reference.

TECHNICAL FIELD

The present invention is related to the deghosting processes with respect to hydrophone/geophone ocean-bottom cable receivers in marine environments. More particularly, the present invention is related to interactively determining optimum deghosting parameter values for suppressing ghost reflections in seismic data obtained from hydrophone/geophone ocean-bottom cable receivers.

BACKGROUND

In the field of marine seismic surveying, seismic data acquisition entails deploying ocean bottom cables ("OBCs") containing paired combinations of hydrophone/geophone sensors (i.e., receivers) at or near the ocean bottom. Seismic pressure sources near the ocean surface are then activated and the seismic signals received by each of the component phones in the hydrophone/geophone combination sensors (i.e., pressure for the hydrophone sensors and particle velocity for the geophone sensors) are recorded.

Typically, the signals received by each of the component phones are combined numerically in various ways to preferentially enhance that part of the signal due to reflected energy arriving from below the sensors and suppress that part of the signal due to reflected energy arriving from above the sensors. The reflected energy arriving from below the sensors indicate the depth and location of the reflecting geological features. The data from the received seismic signals may then be interpreted to aid in determining the presence of hydrocarbon reserves. The undesirable reflected energy arriving from above the sensors is known as a "ghost" reflection. A ghost reflection occurs when seismic energy initially reverberates upward from the shallow subsurface (i.e., the earth below the ocean bottom) and then is reflected back downward from the ocean surface. Ghost reflections are represented as noise in the "true" reflected signal (i.e., the reflected energy arriving from below the sensors) and may mask (or hide) useful information regarding the location or attributes of geological features.

Presently, various processes (i.e., "deghosting" processes) are known for suppressing ghost reflections in seismic data received from OBCs. These processes comprise a "black box" solution in which an algorithm is utilized to compute a deghosting component of an arithmetic operation for eliminating the effects of ghost reflections in seismic data. A significant drawback in current deghosting processes is that hydrophone/geophone receivers are treated as an independent entity with no predictable correlation with other sensors in the vicinity. As a result, in many cases the deghosting components are erroneously computed as being highly variable between receiver locations within a survey.

It is with respect to these considerations and others that the various embodiments of the present invention have been made.

SUMMARY

Illustrative embodiments of the present invention address these issues and others by providing a computer-implemented method of interactively determining optimum deghosting parameter values for suppressing ghost reflections. According to the method, seismic data is obtained from hydrophone/geophone receiver locations. Energy traces are generated which include measures of the deghosting parameter values from the seismic data obtained from each of the hydrophone/geophone receiver locations. The energy traces are displayed. A set of "seed values" is provided by the user, preferably interactively, as a starting point. In response to receiving these "seed values," deghosting parameter values are picked based on the energy traces. The picked deghosting parameter values are displayed. A user then interactively edits and/or smooths the picks to obtain optimum deghosting parameter values. The optimum deghosting parameter values are utilized for suppressing ghost reflections in the seismic data.

Other illustrative embodiments of the invention may also be implemented in a computer system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION

Figure 1:
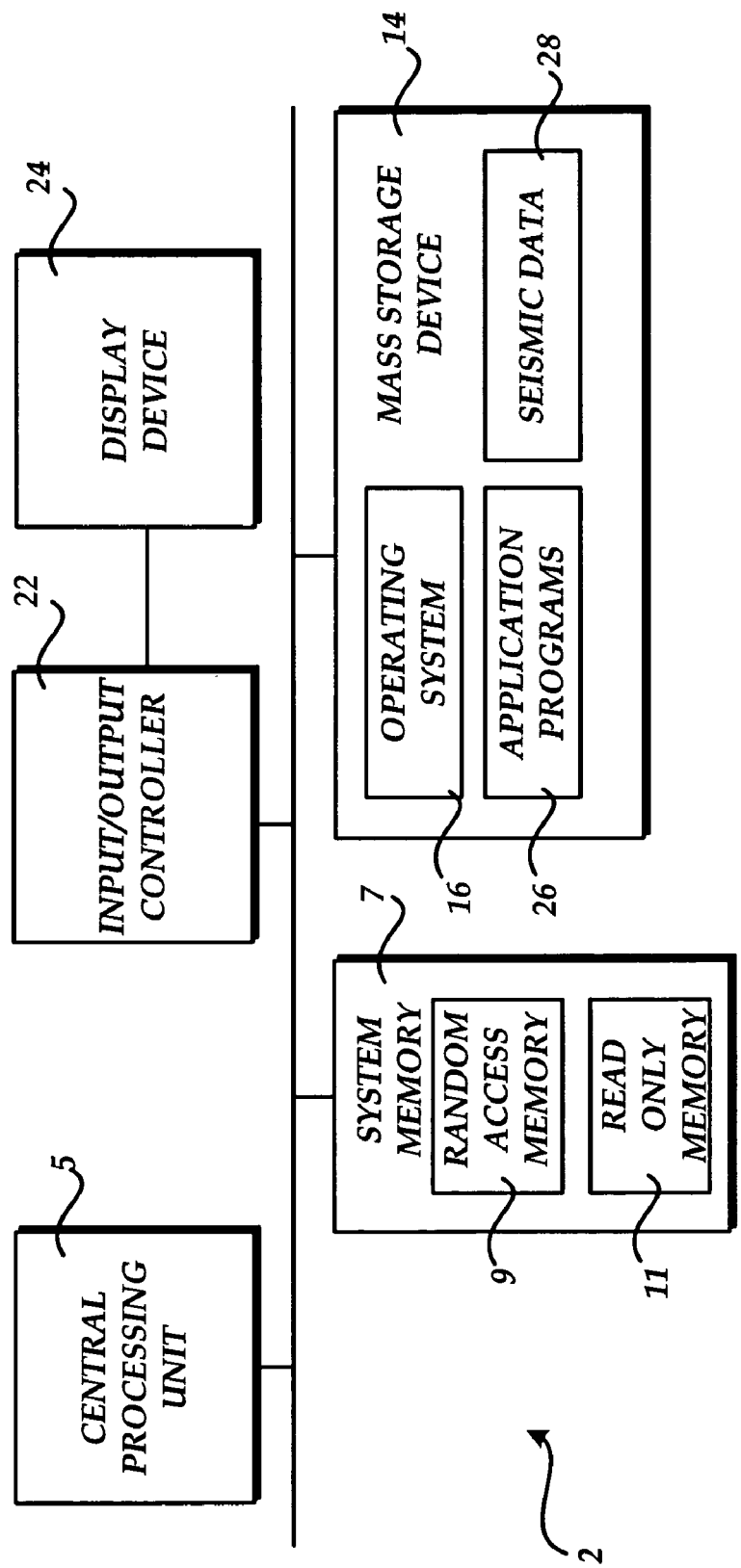
FIG. 1 shows a typical computer system operating environment for illustrative embodiments of the present invention.

Illustrative embodiments of the present invention provide for interactively determining optimum deghosting parameter values for suppressing ghost reflections in seismic data collected in ocean bottom hydrophone/geophone receivers. The illustrative embodiments of the present invention are implemented as logical processing operations that are performed on the seismic data. The calculation and visual display of deghosting parameter values, which may be manipulated by a user, may result from the execution of program modules on a conventional computer system, described below with reference to FIG. 1.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs 26, and seismic data 28, which will be described in greater detail below.

The mass storage device 14 is connected to the CPU 5 through a mass storage controller (not shown) connected to the bus 12. The mass storage device 14 and its associated computer readable media provide non-volatile storage for the computer 2. Although the description of computer readable media contained herein refers to a mass storage device, such as a hard disk or CD-ROM drive, it should be appreciated by those skilled in the art that computer readable media can be any available media that can be accessed by the computer 2.

By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

The computer 2 may also include an input/output controller 22 for receiving and processing input from a number of other devices, including a keyboard, mouse, or electronic stylus (not shown in FIG. 1). Similarly, an input/output controller 22 may provide output to display screen 24, a printer, or other type of output device.

As mentioned briefly above, a number of program modules and data files may be stored in the mass storage device 14 and RAM 9 of the computer 2, including an operating system 16 suitable for controlling the operation of a personal computer, such as the LINUX operating system. It should be appreciated, however, that according to the various aspects of the invention described herein, the computer 2 may also be controlled by other operating systems. The computer 2 is also capable of executing one or more application programs. In particular, the computer 2 is operative to execute application programs 26. According to the various illustrative embodiments of the invention, the application programs 26 contain program modules for performing various data processing and volume rendering operations on input data, such as the seismic data 28. The seismic data 28 may include measurements of pressure and velocity reverberation energy (i.e., "traces") obtained by hydrophone/geophone receivers which are components of OBCs deployed in a marine environment.

In particular and as will be described in greater detail below, the data processing and volume rendering operations performed by the application programs 26 include the calculation, graphical rendering, and display in a multidimensional volume, of deghosting parameter values or scalars for minimizing the residual ghost energy measured by the hydrophone/geophone receivers and recorded in the seismic data 28. It should be appreciated that by means of interactive inspection and manipulation in the displayed volume, a user may visually assess where the most reasonable deghosting parameter values should be chosen and adjust any calculated deghosting parameter values (or picks) to match this assessment. According to one embodiment of the invention, the application programs 26 comprise the ProMAGIC™, ProMAX™, and GeoProbe™ application programs from LANDMARK GRAPHICS CORPORATION of Houston, Tex. It should be appreciated, however, that the various aspects of the invention described herein may be utilized with other application programs from other manufacturers. Additional details regarding the various functions performed by the application programs 26 will be provided below with respect to FIGS. 2-4.

Figure 2:
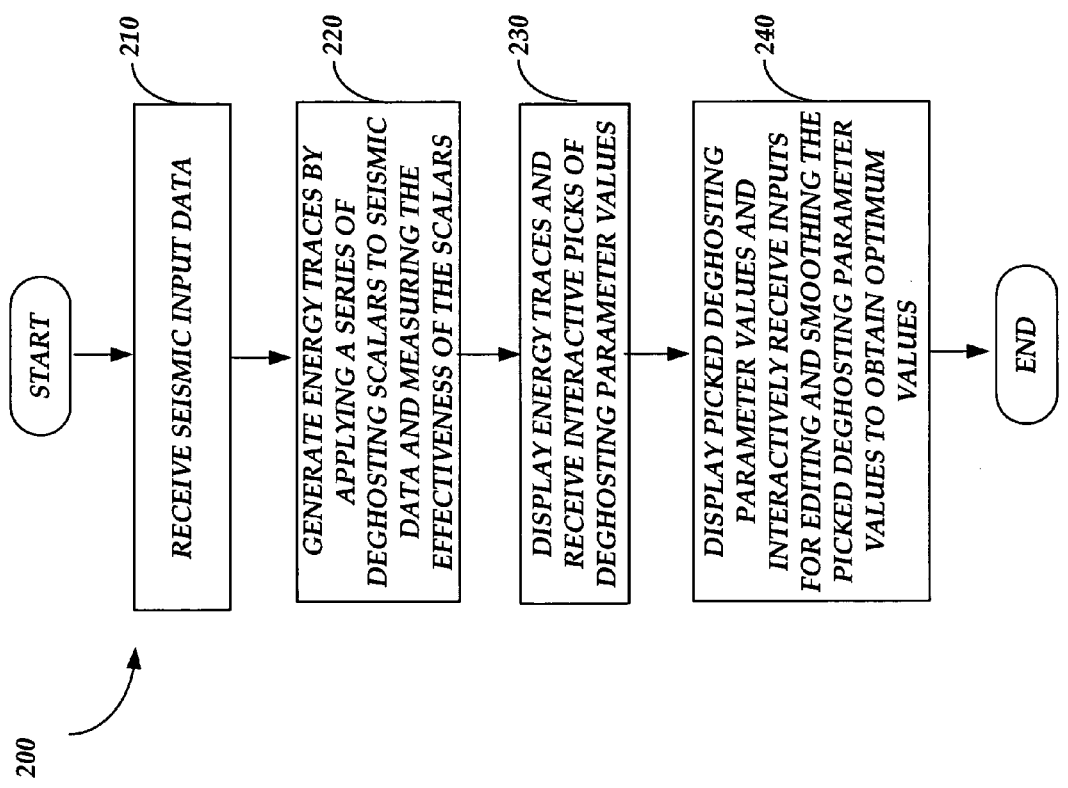
FIG. 2 shows the logical operations performed by an illustrative embodiment for interactively determining optimum deghosting parameter values for suppressing ghost reflections in seismic data.

Referring now to FIG. 2, illustrative logical operations or routines will be described illustrating a process for interactively determining optimum deghosting parameter values for suppressing ghost reflections in seismic data. When reading the discussion of the illustrative routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 2, and making up illustrative embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Referring now to FIG. 2, an illustrative routine 200 performed by a processing device, such as the CPU 5 of the computer of FIG. 1 will be described for interactively determining optimum deghosting parameter values for suppressing ghost reflections in seismic data. The routine 200 begins at operation 210 where the application programs 26 executed by the CPU 5 receives the seismic data 28 by retrieving it from the mass storage device 14. In particular, the seismic data 28, which may include measurements of pressure and velocity traces obtained by hydrophone/geophone receivers over a user-specified area in a marine environment, may be retrieved by a user after launching the application programs 26.

The routine 200 then continues from operation 210 at operation 220 where the application programs 26 generate an energy trace by applying a series of deghosting scalars on the received seismic data 28. It should be understood that in accordance with the various embodiments of the invention, an "energy trace" is a graphical representation of a series of statistically determined values derived from autocorrelations of arithmetic combinations of the pressure and velocity traces for a series of deghosting parameter trials. It should further be understood that deghosting parameters (also known as scalars) are numerical constant values which are utilized, according to one embodiment of the invention, to assist a seismic data processor in determining an optimum constant value (i.e., a best scalar or optimum deghosting parameter) for removing receiver ghosts (i.e., undesirable signals generated by reflected energy arriving from above the ocean floor) from the hydrophone/geophone receiver data. In one illustrative embodiment, the energy trace is generated through the following steps:

1) Combining each pair of pressure and velocity traces measured by one hydrophone/geophone receiver using a test scalar;

2) Calculating an auto correlation function ("ACF") for a "time gate" of each summed trace for each receiver;

3) Stacking all of the calculated ACFs;

4) Determining a single value to represent all of the values in the ACF stack (e.g., by summing the absolute values of the ACF stack samples over the time gate); and 5) Repeating steps 1-4 for all of a set of test scalar values.

It should be understood that the set of test scalar values is user-selectable and may be a range of numerical constants (i.e., minimum and maximum scalars) along with an increment, which are used for calculating optimum deghosting parameters for the hydrophone/geophone receiver data. It will be appreciated that if neither the minimum nor the maximum scalar in such a range is a multiple of the increment, it may be adjusted by the application programs 26.

In step 1, each summed trace is the combination of one pair of pressure and particle velocity traces from a hydrophone/geophone receiver using the equation S=P+Scale*V, where S is the summed trace, P is the pressure trace, Scale is the test deghosting scalar, V is the velocity trace, + is arithmetic addition and * is arithmetic multiplication.

In step 2, an ACF is a mathematical function which outputs the autocorrelation of each summed trace over a user-specified time period (i.e., the "time gate"). It will be appreciated that in one embodiment, the length of the time gate of the ACF is at least as long as the two-way travel time in the water layer containing the receivers. It will further be appreciated that the time gate for the ACF should exclude first arrivals and source-generated noise. In one embodiment, a user may also define minimum and maximum source-receiver offsets to correlate. Pairs of pressure and velocity traces with offsets outside the specified range are not summed and correlated. The offset range is used along with the time gate for the ACF to exclude noise from the data to be correlated.

In step 3, the ACFs for all summed traces for a receiver are combined (i.e., "stacked") to form the ACF stack. In one embodiment, each sample of the ACF stack is created by taking the arithmetic mean of the corresponding sample of each ACF.

In step 4, the values of the ACF stack are combined to produce a single value that is a measure of the effectiveness of the test scalar in deghosting the data. Depending upon the measure of effectiveness that is used, the most effective deghosting scalar can be the one with the minimum or maximum value. In one embodiment, the sum of the absolute values of the ACF stack samples in a user-specified time period comprising starting and ending times in milliseconds (i.e., the "measure gate") is used as the measure of effectiveness. It will be appreciated that it may be desirable that the measure gate be a short gate bracketing the arrival time of the first ghost on the ACF stack. It will further be appreciated that it may further be desirable that the measure gate exclude near-zero lags in the ACF stack, which correspond to a signal wavelet and do not vary with scalar. Including ghost lags and excluding near-zero lags from the measure gate enhances the contrast between good and bad scalars. For this measure, the most effective deghosting scalar is the one with the minimum value.

In step 5, steps 1 to 4 are repeated for each scalar in the test set to yield a single trace (i.e., the "energy trace") for the receiver location. Each sample on the energy trace is a measure of the effectiveness of one scalar in the test range in deghosting the data for a receiver. It will be appreciated that the scalar values described herein may also be referred to as deghosting parameter values. Steps 1 to 5 are repeated for each receiver location to produce a set of energy traces, one for each receiver location.

Figure 3:
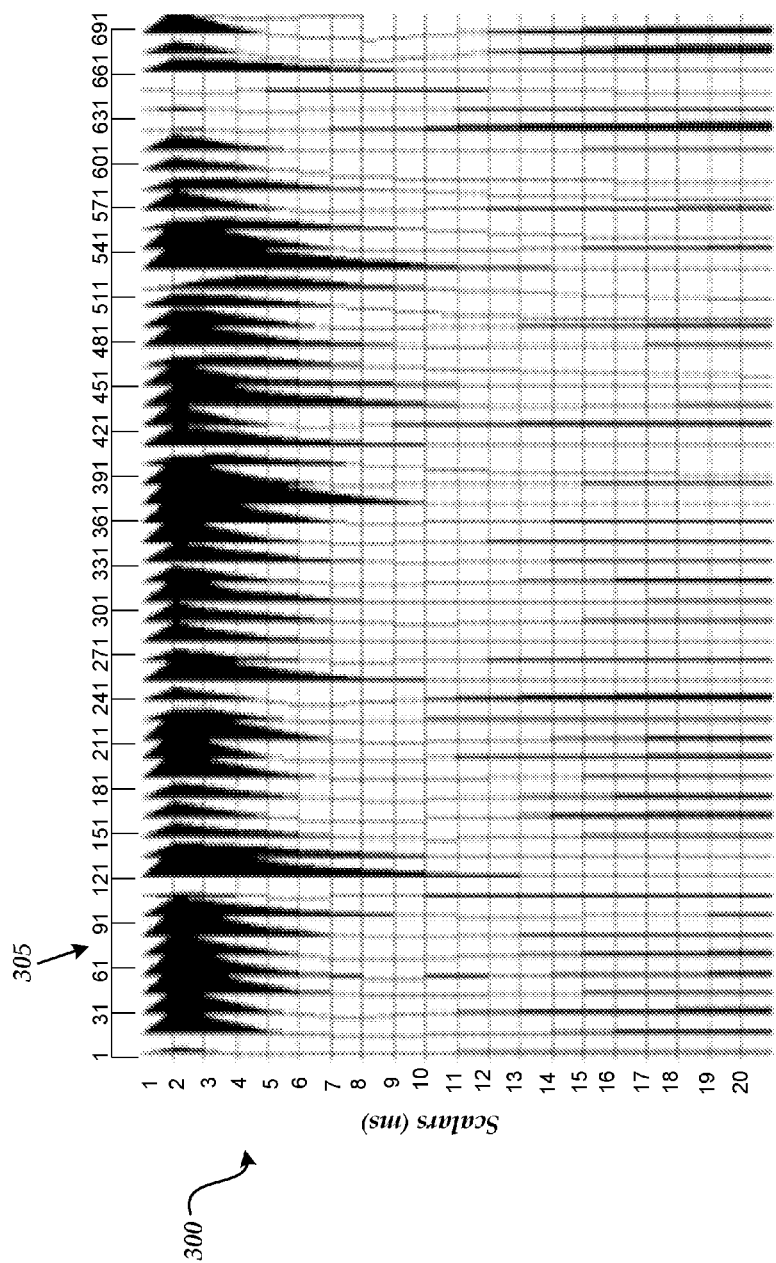
FIG. 3 shows a computer-generated display of energy traces for several hydrophone/geophone receiver locations, according to an illustrative embodiment of the invention.

The routine 200 then continues from operation 220 to operation 230, where the application programs 26 display the energy traces as a two or three dimensional graph on a display device 24 connected to the computer 2. An illustrative display of energy traces for a group of hydrophone/geophone receivers is shown in FIG. 3, which will be discussed in greater detail below. A user (such as a seismic processor or interpreter) interactively provides a set of "seed values" as a starting point. In response to receiving the user "seed values," the application programs 26 pick deghosting parameter values for all of the displayed energy traces.

Figure 4:
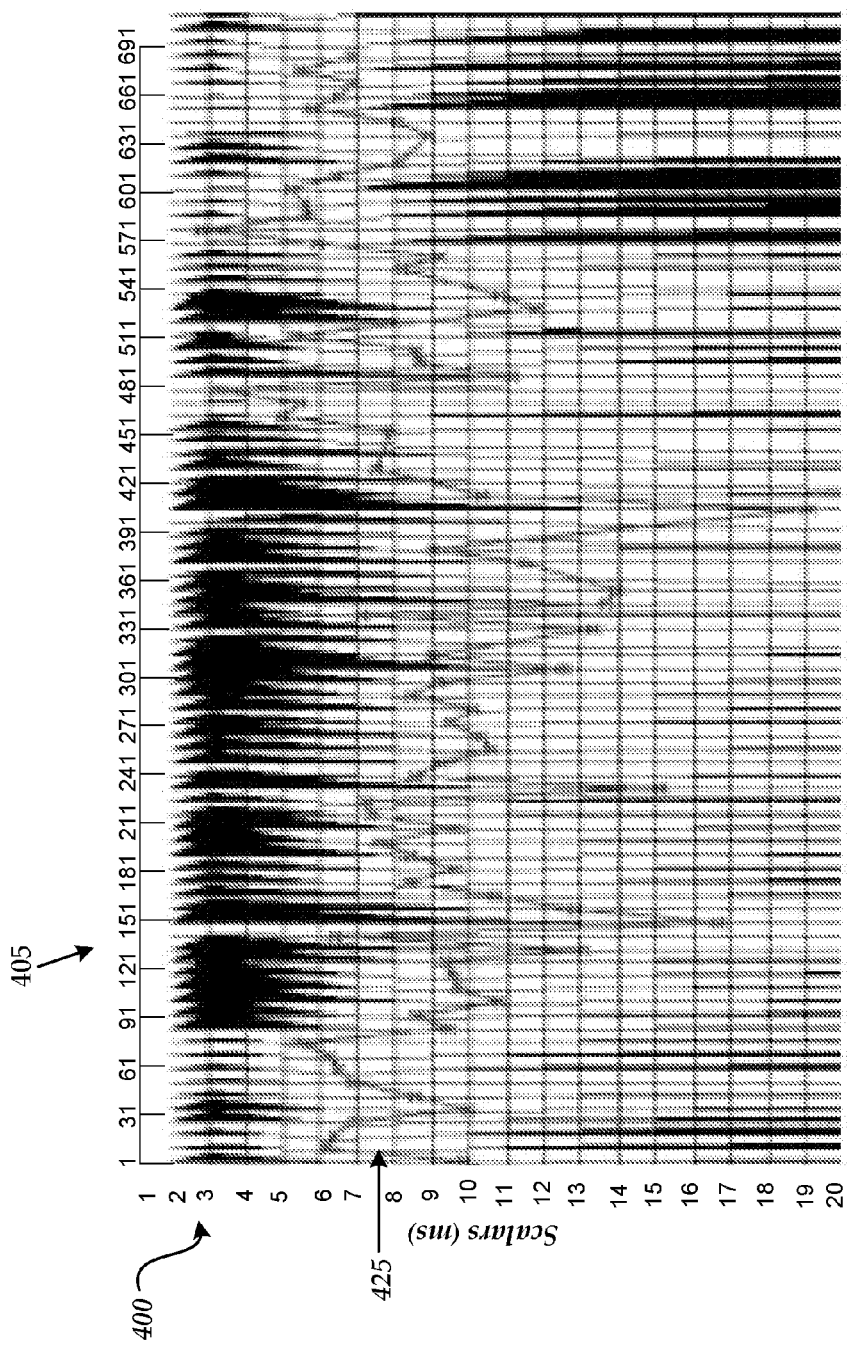
FIG. 4 shows a computer-generated display of energy traces for several hydrophone/geophone receiver locations including a deghosting parameter value for each receiver location, according to an illustrative embodiment of the invention.

The routine 200 then continues from operation 230 to operation 240, where the application programs 26 display the picks on the display device 24. The application programs 26 enable a user to visually inspect the picked deghosting parameter values and interactively modify them as appropriate. An illustrative display of energy traces with picked deghosting parameter values is shown in FIG. 4, which will be discussed in greater detail below.

Figure 5:
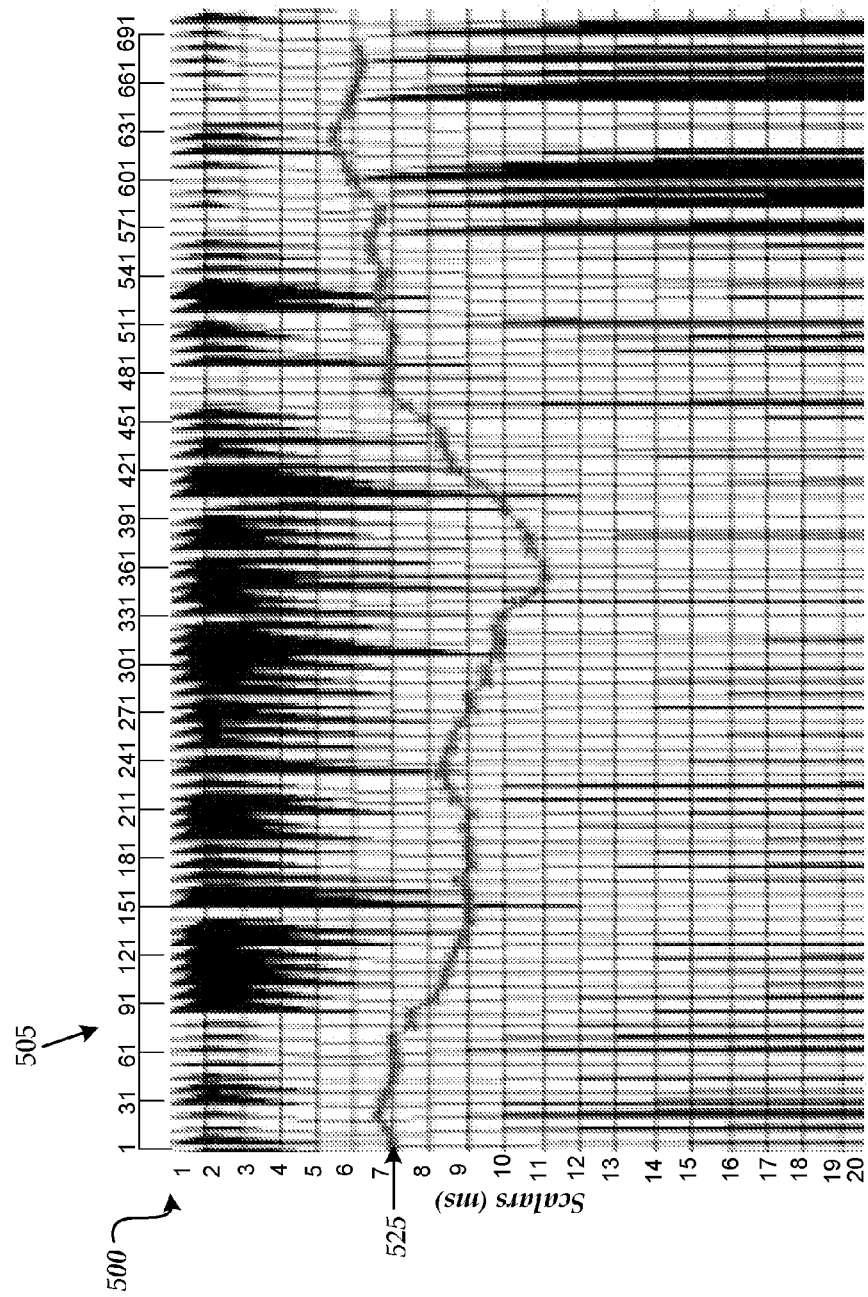
FIG. 5 shows a computer-generated display of energy traces for several hydrophone/geophone receiver locations after a smoothing operator has been applied to deghosting parameter values, according to an illustrative embodiment of the invention.

It will be appreciated that the user may consider a number of factors in forming a basis for adjusting a calculated deghosting parameter value on the energy trace based on the user's geophysical and geologic insight. These factors may include scientific concepts, the amount of variation between deghosting parameters for different receivers, signal to noise ratio, the geographical location of the marine environment from which the seismic data was obtained, and known characteristics of the water bottom on which the receivers are placed. For instance, a user familiar with the geographical characteristics of the water bottom from which a series of energy traces were generated may expect to see energy traces with little variation between deghosting parameter values for each receiver location. If the energy traces generated and displayed by the application programs 26 show a high variation in the calculated deghosting parameter values, the application programs 26 enable the user to interactively adjust the displayed deghosting parameters based on the user's understanding of the water bottom from which the deghosting parameters were calculated. For instance, a user may instruct the application programs 26 to apply a smoothing operator to remove erratic variations in deghosting parameter values that are caused by noise and are not representative of actual variations in the water bottom. An illustrative display of energy traces with smoothed deghosting parameter values is shown in FIG. 5, which will be discussed in greater detail below.

Eventually, a user may decide that the interactively determined deghosting parameters are optimum and the variation of values between receivers reflects a user's geophysical and geologic insight with respect to a particular water bottom in a marine environment. The user may then direct the application programs 26 to store the optimum deghosting parameter for each receiver on the mass storage device 14. The logical operations 200 then end.

FIG. 3 shows a computer-generated display of energy traces 300 for several hydrophone/geophone receiver locations 305, according to an illustrative embodiment of the invention. As discussed above with respect to FIG. 2, the energy traces 300 may be interactively picked by a user to provide a set of "seed values" so that the application programs 26 can pick the optimum deghosting parameter values for all of the displayed energy traces 300.

FIG. 4 shows a computer-generated display of energy traces 400. FIG. 4 is similar to FIG. 3 except for the addition of deghosting parameter values (shown as the curve 425) for the receiver locations 405, according to an illustrative embodiment of the invention. As discussed above with respect to FIG. 2, the application programs 26 enables a user to adjust a displayed deghosting parameter value for one or more receiver locations.

FIG. 5 shows a computer-generated display of energy traces 500. FIG. 5 is similar to FIG. 4 except for the application of a smoothing operator to the deghosting parameter values curve 525, according to an illustrative embodiment of the invention. As discussed above with respect to FIG. 2, the application programs 26 may be instructed by a user to apply a smoothing operator to the deghosting parameter values to remove erratic variations that are caused by noise and are not representative of actual variations in the water bottom.

Based on the foregoing, it should be appreciated that the various embodiments of the invention include methods, systems, and computer readable media are provided for interactively determining optimum deghosting parameter values for suppressing ghost reflections. Seismic data are obtained from various hydrophone/geophone receiver locations. Energy traces are calculated from the seismic data and displayed. A user interactively picks deghosting parameter values, views them, edits and smooths them to obtain the optimum values. The optimum deghosting parameter values are utilized for suppressing ghost reflections in the seismic data.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method for interactively determining optimum deghosting parameter values for suppressing ghost reflections in seismic data obtained from hydrophone/geophone receiver locations, comprising:

generating a plurality of energy traces, each of the plurality of energy traces representing a measure of the effectiveness of a set of trial deghosting parameter values for the hydrophone/geophone receiver locations, wherein the set of trial deghosting parameter values comprise a range of numerical constants and at least one increment, wherein the range comprises a minimum deghosting parameter value and a maximum deghosting parameter value, wherein, if neither the minimum deghosting parameter value nor the maximum deghosting parameter value is a multiple of the increment, then adjusting at least one of the minimum and maximum deghosting parameter values so that the at least one of the minimum and maximum deghosting parameter values is a multiple of the increment;

displaying the plurality of energy traces;

receiving an input of interactively picked deghosting parameter values based on a visual inspection of the displayed plurality of energy traces;

displaying the picked deghosting parameter values; and receiving an input for interactively editing and smoothing the displayed picked deghosting parameter values based on a visual inspection of the displayed picked deghosting parameter values to obtain the optimum deghosting parameter values, wherein smoothing the picked deghosting parameter values comprises removing erratic variations in the displayed picked deghosting parameter values which are caused by noise which and are not representative of actual variations in a water bottom comprising the hydrophone/geophone receiver locations and wherein the optimum deghosting parameter values comprise optimum scalar values for each of the hydrophone/geophone receiver locations.

2. The method of claim 1, wherein generating a plurality of energy traces comprises:

calculating for each deghosting parameter value in the set of trial deghosting parameter values, a measure of effectiveness in suppressing ghost reflections in the seismic data obtained from a corresponding hydrophone/geophone receiver location; and combining the calculated measures to generate the plurality of energy traces.

3. The method of claim 1, wherein receiving an input of interactively picked deghosting parameter values comprises:

receiving an input of a set of interactively picked seed values; and automatically picking the deghosting parameter values for displayed plurality of energy traces.

4. The method of claim 1, wherein receiving an input for interactively editing and smoothing the picked deghosting parameter values to obtain the optimum deghosting parameter values comprises:

interactively receiving an input to adjust at least one of the displayed picked deghosting parameter values if the displayed plurality of energy traces show a high variation in the picked deghosting parameter values; and applying a smoothing operator to the picked deghosting parameter values.

5. The method of claim 1, wherein receiving an input for interactively editing and smoothing the picked deghosting parameter values to obtain the optimum deghosting parameter values comprises applying a smoothing operator to the picked deghosting parameter values.

6. A computer system for interactively determining optimum deghosting parameter values for suppressing ghost reflections in seismic data obtained from hydrophone/geophone receiver locations, comprising:

a memory for storing executable program code;

a display device; and a processor functionally coupled to the memory, the processor being responsive to computer-executable instructions contained in the program code, wherein the processor is configured to generate a plurality of energy traces, each of the plurality of energy traces representing a measure of the effectiveness of a set of trial deghosting parameter values for the hydrophone/geophone receiver locations, wherein the set of trial deghosting parameter values comprise a range of numerical constants and at least one increment, wherein the range comprises a minimum deghosting parameter value and a maximum deghosting parameter value, wherein, if neither the minimum deghosting parameter value nor the maximum deghosting parameter value is a multiple of the increment, then adjusting at least one of the minimum and maximum deghosting parameter values so that the at least one of the minimum and maximum deghosting parameter values is a multiple of the increment, displaying the plurality of energy traces, receiving an input of interactively picked deghosting parameter values based on the displayed energy traces, displaying the picked deghosting parameter values, and receiving an input for interactively editing and smoothing the picked deghosting parameter values based on a visual inspection of the displayed picked deghosting parameter values to obtain the optimum deghosting parameter values, wherein smoothing the picked deghosting parameter values comprises removing erratic variations in the displayed picked deghosting parameter values which are caused by noise which and are not representative of actual variations in a water bottom comprising the hydrophone/geophone receiver locations and wherein the optimum deghosting parameter values comprise optimum scalar values for each of the hydrophone/geophone receiver locations.

7. The system of claim 6, wherein generating a plurality of energy traces comprises:

calculating for each deghosting parameter value in the set of trial deghosting parameter values, a measure of effectiveness in suppressing ghost reflections in the seismic data obtained from a corresponding hydrophone/geophone receiver location; and combining the calculated measures to generate the plurality of energy traces.

8. The system of claim 6, wherein receiving an input of interactively picked deghosting parameter values comprises:

receiving an input of a set of interactively picked seed values; and automatically picking the deghosting parameter values based on the displayed plurality of energy traces.

9. The system of claim 6, wherein receiving an input for interactively editing and smoothing the picked deghosting parameter values to obtain the optimum deghosting parameter values comprises:

interactively receiving an input to adjust at least one of the displayed picked deghosting parameter values if the displayed plurality of energy traces show a high variation in the picked deghosting parameter values; and applying a smoothing operator to the picked deghosting parameter values.

10. The system of claim 6, wherein receiving an input for interactively editing and smoothing the picked deghosting parameter values to obtain the optimum deghosting parameter values comprises:

applying a smoothing operator to the picked deghosting parameter values.

11. A computer readable medium containing instructions that when executed by a computer perform a method for interactively determining optimum deghosting parameter values for suppressing ghost reflections in seismic data obtained from hydrophone/geophone receiver locations, comprising:

generating a plurality of energy traces, each of the plurality of energy traces representing a measure of the effectiveness of a set of trial deghosting parameter values for the hydrophone/geophone receiver locations, wherein the measure of the effectiveness of the set of trial deghosting parameter values comprises the sum of the absolute values of auto correlation function stack samples over a measure gate comprising a user-specified time period, wherein the measure gate is a short gate bracketing an arrival time of a first ghost reflection in the auto correlation function stack, wherein the measure gate excludes near-zero lags in the auto correlation function stack, wherein the near-zero lags correspond to a signal wavelet and do not vary with the deghosting parameter values, thereby enhancing the contrast between good and bad deghosting parameter values, wherein the set of trial deghosting parameter values comprise a range of numerical constants and at least one increment, wherein the range comprises a minimum deghosting parameter value and a maximum deghosting parameter value, wherein, if neither the minimum deghosting parameter value nor the maximum deghosting parameter value is a multiple of the increment, then adjusting at least one of the minimum and maximum deghosting parameter values so that the at least one of the minimum and maximum deghosting parameter values is a multiple of the increment;

displaying the plurality of energy traces;

receiving a user input of interactively picked deghosting parameter values based on the displayed energy traces;

displaying the picked deghosting parameter values; and receiving an input for interactively editing and smoothing the picked deghosting parameter values deghosting parameter values based on a visual inspection of the displayed picked deghosting parameter values to obtain the optimum deghosting parameter values, wherein smoothing the picked deghosting parameter values comprises removing erratic variations in the displayed picked deghosting parameter values which are caused by noise which and are not representative of actual variations in a water bottom comprising the hydrophone/geophone receiver locations and wherein the optimum deghosting parameter values comprise optimum scalar values for each of the hydrophone/geophone receiver locations.

12. The computer readable medium of claim 11, wherein generating a plurality of energy traces comprises:
   calculating for each deghosting parameter value in the set of trial deghosting parameter values, a measure of effectiveness in suppressing ghost reflections in the seismic data obtained from a corresponding hydrophone/geophone receiver location; and
   combining the calculated measures to generate the plurality of energy traces.

13. The computer readable medium of claim 11, wherein receiving an input of interactively picked deghosting parameter values comprises:
   receiving an input of a set of interactively picked seed values; and
   automatically picking the deghosting parameter values based on the displayed plurality of energy traces.

14. The computer readable medium of claim 11, wherein receiving an input for interactively editing and smoothing the picked deghosting parameter values to obtain the optimum deghosting parameter values comprises:
   interactively receiving an input to adjust at least one of the displayed picked deghosting parameter values if the displayed plurality of energy traces show a high variation in the picked deghosting parameter values; and
   applying a smoothing operator to the picked deghosting parameter values.

15. The computer readable medium of claim 11, wherein receiving an input for interactively editing and smoothing the picked deghosting parameter values to obtain the optimum deghosting parameter values comprises:
   applying a smoothing operator to the picked deghosting parameter values.

* * * * *